Patented Jan. 11, 1944

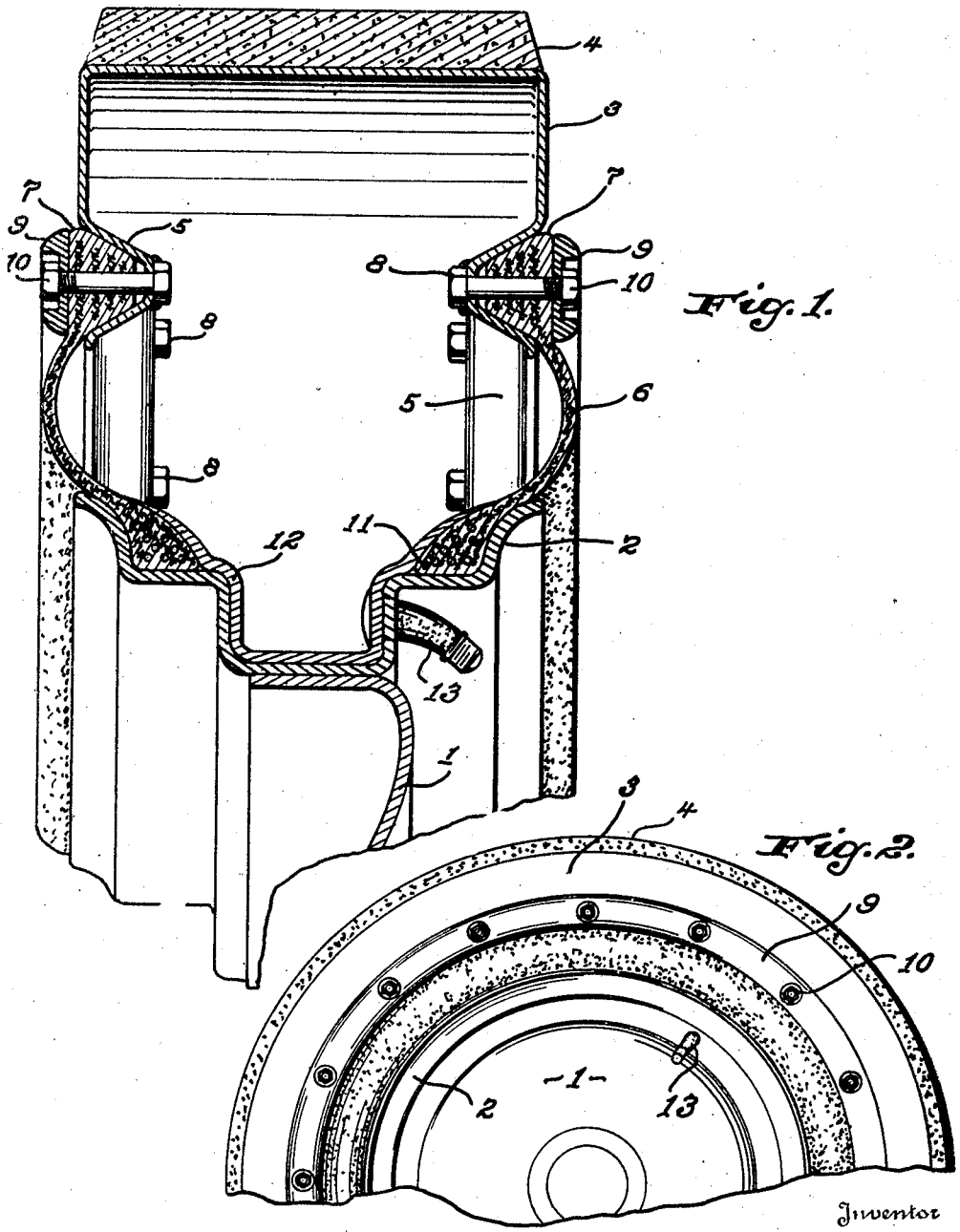

2,338,875

UNITED STATES PATENT OFFICE 2,338,875

VEHICLE TIRE

Nathan Howe Shillman, Baltimore, Md.

Application March 19, 1942, Serial No. 435,270

5 Claims. (Cl. 152—56)

This invention relates to a punctureproof vehicle tire that will fit on standard wheels and have the same air space and substantially the same resiliency as the full pneumatic rubber tire of the present day, and yet one which will require considerably less rubber to manufacture. The tire has an outer rim section of stamped or molded channel formation, so that the sides of the channel form ribs supporting the rim against deformation, and the rim has an outer solid rubber or other resilient tire vulcanized thereon. The inner portions of the channel walls are bent into a V-shaped groove. Flexible side sections, preferably of rubber, with beads on both edges, complete the sides of the tire. The outer bead is wedged into the channel grooves and held fast by bolts, the inner bead is of standard construction and is placed on the standard wheel rim. The stamped or pressed channel encloses a substantial portion, preferably half, of the air space, the flexible side sections and wheel rim forming the balance. If desired a strip of soft rubber may be vulcanized on the inner edge of the two flexible side sections to be sure of a sealed connection between them. The usual valve is provided, preferably in the soft rubber strip, to inflate the tire.

Should the tire become deflated for any reason, the substantially rigid channel will maintain its shape, and the wheel will pull downwardly on the flexible side wall sections on each side of the wheel hub and support the load by the tension on the flexible sections, so that these sections will not be crushed or cut in the line between the hub and the point of road contact of the wheel. If the flexible side walls are resilient rubber, the load may be resiliently held without inflation of the tires. Of course the tension on the upper section of the flexible sections likewise sustains a part of the load.

Other objects and advantages of the invention will be apparent from the following description and accompanying drawing forming a part hereof and in which:

Figure 1 is a cross sectional view of a tire embodying the invention.

Figure 2 is a side view thereof.

The tire of the invention is designed for application to a standard automobile wheel 1 having a standard automobile rim 2 thereon. It has substantially the same overall diameter of the full rubber pneumatic tire that it will displace, while requiring only a small proportion of the rubber heretofore required. The tire consists of the substantially rigid outer channel 3, having a rubber tread 4 vulcanized to its outer rim. The inner edges of the channel sides have V-shaped grooves 5. Flexible and preferably resilient sectional side walls 6 complete the sides of the tires. These flexible side walls 6 are preferably made of rubber. They have beads on their inner and outer edges. Those on the outer edge 7 are wedge shape in formation to fit into the grooves 5. Bolts 8 are preferably welded to the channel grooves 5 and they pass through openings in the bead 7, and the beads 7 after being wedged into the grooves, and vulcanized therein, if desired, are held firmly by bolts 8 and the rings 9. These rings have countersunk openings for the nuts 10 turned tightly on bolts 8. The inner beads 11 on the sectional side walls 6 are of the usual construction to fit the standard rim 2. A strip of soft rubber 12 may connect the two inner beads of the sectional side walls and may be vulcanized thereto to form an air tight tire. A valve 13 placed in this strip 12 admits air for inflation of the tire.

The channel 3 may be made of stamped metal or of a molded plastic or other material which will give it substantial rigidity.

If quite resilient side walls were used the tires could be used without inflation by simply relying upon the resiliency furnished by those side walls.

Were it desired, the bolt heads could be smoothed and an inner tube used in the tire.

In the event of injury to any part of the tire, that part may be replaced without the whole tire being lost. The tire is substantially punctureproof and even should a puncture occur in the flexible sectional side walls, the tire would not collapse upon itself and crush and cut those side walls, because of the support furnished by them at each side of and above the hub of the wheel.

The complete tire holds substantially the same amount of air as is held by the usual rubber casing and no inner tube is required. Since the compression of the air furnishes the principal elasticity for a pneumatic tire and since the volume of air in the tire of this invention is substantially the same as in the usual tire, the tire will have very nearly the same resiliency in operation. When driven over obstructions on the road the sides of the channel 3 will prevent distortion of the channel tread, and the rigidity of the channel will distribute the impact over substantially the whole of the tire.

The amount of rubber in the sectional side walls 6 is approximately half of that in the usual casing side walls; substantially the whole of the inner tube is saved and consequently a large proportion of rubber is saved.

What I claim as new and desire to secure by Letters Patent is:

1. A vehicle tire comprising an outer, inwardly opening substantially rigid channel having an outer section and side walls adapted to be placed around a wheel rim, outwardly opening V shaped grooves in the inner diameter of said side walls, flexible side walls connectable to said channel and rim, inwardly directed V shaped beads on the outer diameter of said flexible side walls and means to wedge said beads inwardly into said outwardly opening grooves to form a tight seal therewith.

2. A vehicle tire comprising an outer, inwardly opening substantially rigid channel having an outer section and side walls adapted to be placed around a wheel rim, outwardly opening V shaped grooves in the inner diameter of said side walls, flexible side walls connectable to said channel and rim, inwardly directed V shaped beads on the outer diameter of said flexible side walls and a ring on the outer face of said beads and means to force said ring inwardly against said bead to wedge the same inwardly tightly into said outwardly opening groove to form a tight seal therewith.

3. A vehicle tire comprising an outer, inwardly opening substantially rigid channel having an outer section and side walls adapted to be placed around a wheel rim, outwardly opening V shaped grooves in the inner diameter of said side walls, flexible side walls connectable to said channel and rim, inwardly directed V shaped beads on the outer diameter of said flexible side walls and bolts passing through said bead and groove to wedge the same tightly together to form a sealed joint.

4. A vehicle tire comprising an outer, inwardly opening substantially rigid channel having an outer section and side walls adapted to be placed around a wheel rim, outwardly opening V shaped grooves in the inner diameter of said side walls, flexible side walls connectable to said channel and rim, inwardly directed V shaped beads on the outer diameter of said flexible side walls and a ring on the outer face of said bead and bolts passing through said ring, bead and groove to force the ring tightly against said bead to wedge the bead inwardly into said outwardly opening groove to form a tight seal therewith.

5. A vehicle tire comprising an outer, inwardly opening substantially rigid channel having an outer section and side walls adapted to be placed around a wheel rim, outwardly opening V shaped grooves in the inner diameter of said side walls, flexible side walls connectable to said channel and rim, inwardly directed V shaped beads on the outer diameter of said flexible side walls, means to wedge said beads inwardly into said outwardly opening grooves to form a tight seal therewith, and a flap extending across said rim and vulcanized at its edges to said flexible side walls.

NATHAN HOWE SHILLMAN.